United States Patent
Gotz et al.

(10) Patent No.: US 9,731,702 B2
(45) Date of Patent: Aug. 15, 2017

(54) METHOD AND DEVICE FOR ACTUATING A MOBILE WORK MACHINE

(71) Applicant: ZF Friedrichshafen AG, Friedrichshafen (DE)

(72) Inventors: Manuel Gotz, Ravensburg (DE); Mark Mohr, Tettnang (DE); Udo Brehmer, Friedrichshafen (DE); Kazutaka Iuchi, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 218 days.

(21) Appl. No.: 14/399,219

(22) PCT Filed: Apr. 9, 2013

(86) PCT No.: PCT/EP2013/057348
§ 371 (c)(1),
(2) Date: Nov. 6, 2014

(87) PCT Pub. No.: WO2013/178393
PCT Pub. Date: Dec. 5, 2013

(65) Prior Publication Data
US 2015/0120114 A1    Apr. 30, 2015

(30) Foreign Application Priority Data

May 31, 2012  (DE) .................. 10 2012 209 166

(51) Int. Cl.
*B60W 10/02*     (2006.01)
*B60W 20/00*     (2016.01)
(Continued)

(52) U.S. Cl.
CPC ............ *B60W 20/00* (2013.01); *B60W 10/02* (2013.01); *B60W 10/06* (2013.01); *B60W 10/08* (2013.01);
(Continued)

(58) Field of Classification Search
None
See application file for complete search history.

(56) References Cited

U.S. PATENT DOCUMENTS

| 5,407,042 A | * | 4/1995 | Fukui | B60W 30/18 |
| | | | | 192/109 F |
| 5,875,680 A | * | 3/1999 | Lorriette | B60W 10/02 |
| | | | | 192/219 |

(Continued)

FOREIGN PATENT DOCUMENTS

| DE | 101 15 984 A1 | 10/2002 |
| DE | 102 07 699 A1 | 9/2003 |

(Continued)

OTHER PUBLICATIONS

Machine Translation of JP 2008201391 A.*

(Continued)

*Primary Examiner* — John R Olszewski
*Assistant Examiner* — Navid Ziaeianmehdizadeh
(74) *Attorney, Agent, or Firm* — Davis & Bujold, P.L.L.C.; Michael J. Bujold (57) ABSTRACT

A method of controlling a mobile work machine having a reversing gearbox. The driving direction reversal is initiated by detecting a driving direction reversal command. A change of the torque transmission from a current driving direction to a new driving direction is carried out as a powershift. Braking for the driving direction reversal occurs in a manner so as to recuperate energy. Furthermore, a device for controlling a mobile work machine, in particular for implementing the method, is also disclosed.

20 Claims, 3 Drawing Sheets

(51) Int. Cl.
  *B60W 10/06*   (2006.01)
  *B60W 10/08*   (2006.01)
  *B60W 30/18*   (2012.01)
  *B60W 10/18*   (2012.01)
  *F16H 37/04*   (2006.01)

(52) U.S. Cl.
  CPC ...... *B60W 10/18* (2013.01); *B60W 30/18036* (2013.01); *B60W 30/18045* (2013.01); *B60W 30/18127* (2013.01); *B60W 2510/0638* (2013.01); *B60W 2510/109* (2013.01); *F16H 2037/049* (2013.01); *Y10S 903/93* (2013.01); *Y10T 477/26* (2015.01)

(56) References Cited

U.S. PATENT DOCUMENTS

| | | | |
|---|---|---|---|
| 6,910,988 B2 | 6/2005 | Carlsson | |
| 7,497,285 B1* | 3/2009 | Radev | B60K 6/26 180/65.225 |
| 9,102,312 B2* | 8/2015 | Lorentz | B60W 10/02 |
| 2002/0183154 A1* | 12/2002 | Ziemer | B60K 6/365 475/5 |
| 2004/0166989 A1* | 8/2004 | Carlsson | B60T 7/12 477/92 |
| 2004/0180753 A1* | 9/2004 | Takamura | B60W 10/04 477/94 |
| 2005/0227810 A1* | 10/2005 | Nakagawa | B60W 10/02 477/172 |
| 2007/0246274 A1* | 10/2007 | Dreibholz | B60W 10/02 180/65.25 |
| 2008/0000746 A1* | 1/2008 | Schiele | B60K 6/387 192/3.54 |
| 2009/0112412 A1* | 4/2009 | Cawthorne | B60K 6/40 701/54 |
| 2010/0216596 A1* | 8/2010 | Kaltenbach | B60K 6/48 477/118 |
| 2010/0279814 A1* | 11/2010 | Brehmer | F16H 3/66 475/275 |
| 2011/0010031 A1* | 1/2011 | Syed | B60K 6/445 701/22 |
| 2011/0022276 A1* | 1/2011 | Thaduvayi | B60K 6/46 701/48 |
| 2011/0263370 A1* | 10/2011 | Borntraeger | B60K 6/26 475/5 |
| 2011/0306460 A1* | 12/2011 | Haupt | F16H 3/66 475/275 |
| 2013/0151055 A1* | 6/2013 | Kaneko | B60W 10/26 701/22 |
| 2013/0260955 A1* | 10/2013 | Kimata | B60K 6/52 477/3 |
| 2015/0047916 A1* | 2/2015 | Moriki | E02F 9/2075 180/65.285 |

FOREIGN PATENT DOCUMENTS

| | | |
|---|---|---|
| DE | 10 2005 026 272 A1 | 12/2006 |
| DE | 602 12 384 T2 | 5/2007 |
| EP | 1 759 915 A2 | 3/2007 |
| JP | 2008201391 A * | 9/2008 |
| WO | 2011/112138 A1 | 9/2011 |

OTHER PUBLICATIONS

German Search Report Corresponding to 10 2012 209 166.1 mailed May 2, 2013.
International Search Corresponding to PCT/EP2013/057348 mailed Dec. 4, 2013.
Written Opinion Corresponding to PCT/EP2013/057348 mailed Dec. 4, 2013.

* cited by examiner

METHOD AND DEVICE FOR ACTUATING A MOBILE WORK MACHINE

This application is a National Stage completion of PCT/EP2013/057348 filed Apr. 9, 2013, which claims priority from German patent application serial no. 10 2012 209 166.1 filed May 31, 2012.

FIELD OF THE INVENTION

The present invention concerns a method and a device for controlling a mobile work machine.

BACKGROUND OF THE INVENTION

Work machines, particularly those used on building sites, are often required to reverse during working operation, i.e. to reverse their direction of movement. This can be carried out by a so-termed "power-shuttle" function. One possibility is to change the driving direction by virtue of a powershift in the main group by way of a reversing clutch gearbox. In addition a hydrodynamic torque converter is arranged between the engine and the reversing clutch gearbox. In this case the torque converter is used to brake the work machine when the driving direction is reversed. However, large energy losses occur at the torque converter during the braking. A possible way to reduce these energy losses is shown by DE 602 12 384 T2. This describes a method for reversing the driving direction of a moving vehicle, in which to reverse its driving direction the vehicle is braked by a service brake. It is true that in this case braking is not carried out by the engine and torque converter, but with this method significant energy losses occur at the vehicle's brakes.

SUMMARY OF THE INVENTION

The purpose of the present invention is therefore to propose a method and a device of the aforesaid type, which reduce energy losses when the mobile work machine is braked in order to reverse its driving direction.

According to the invention, this objective is achieved by virtue of the characteristics specified in the description below.

To reverse the driving direction of the work machine, it is proposed that braking should be carried out in a recuperative manner. In this way the braking energy used to carry out the driving direction reversal can be recovered and fed back to the work machine. This minimizes or avoids energy loss during braking.

The work machine can be braked recuperatively by means of a hybrid drive. The hybrid drive comprises a primary source of drive-power, in particular an internal combustion engine or the like, and a secondary drive-power source with an energy accumulator. In the latter the braking energy generated at the secondary drive-power source can be stored and fed back again to the secondary drive-power source of the work machine. As the secondary drive-power source, for example an electric machine with an electrical energy accumulator, which can be operated both as a generator and as a motor, or a hydraulic drive with a hydraulic accumulator, or a mechanical drive with a kinematic energy store can be provided.

A particularly simple way to brake the work machine in a recuperative manner, once a direction reversal command has been received at a first point in time, consists in operating an electric machine of a hybrid drive in the drive-train of the work machine as a generator. Preferably, this is continued until at a second point in time the work machine is virtually at rest and the torque transmission is changed from one driving direction clutch to the other with the work machine effectively at rest. The electrical energy produced by operating the electric machine as a generator during this can be fed to an electrical energy accumulator, for example an electric battery. Alternatively, it can be supplied directly to electric auxiliary aggregates. It is also conceivable for part of the energy produced recuperatively to be supplied directly to consumers and otherwise stored.

If in the drive-train of the work machine the electric machine is arranged in the force flow ahead of the driving direction clutches of a reversing clutch gearbox, then the driving direction clutch associated with the current driving direction is kept engaged until a speed of the work machine close to standstill is reached at the second point in time. During this the driving direction clutch associated with the new driving direction is closed before the second time-point is reached. This ensures a completely recuperative braking by the electric machine. Furthermore, the torque transmission from one driving direction clutch to the other can be carried out quickly and simply, for example powershifted by means of overlapping shifts when the work machine is almost at rest at the second point in time.

If in the drive-train of the work machine the electric machine is arranged in the force flow ahead of a hydrodynamic torque converter, then during the braking of the work machine it is advantageous for the converter bridging clutch of the torque converter to be closed or kept in the closed condition. When a predetermined lower rotational speed of the internal combustion engine is reached, which is preferably close to the stalling speed, the converter bridging clutch can be opened and held in the open condition, and the work machine is then braked to rest at the second time-point by means of a service brake or vehicle brake of the work machine. To change the torque transmission to the new driving direction, the driving direction clutch associated with the new driving direction can then be closed.

If in the drive-train of the work machine the electric machine is arranged in the force flow behind the torque converter, then during the braking of the work machine the converter bridging clutch of the torque converter can be changed to or kept in the open condition until the work machine is almost at rest at the second point in time. In this way the torque converter, which is not bridged during its operation, ensures a decoupling of the rotational speed of the internal combustion engine from the speed of the work machine during the braking process. This securely avoids stalling of the internal combustion engine and enables recuperative braking until, at the second time-point, a speed of the work machine close to standstill is reached.

Once the driving direction has been changed, the converter bridging clutch can be held in or brought to its open condition and the vehicle can be driven, for example accelerated by the internal combustion engine, in the new driving direction. When the converter bridging clutch reaches a predetermined operating point it is closed.

In the new driving direction, before and after closing the converter bridging clutch the work machine can be driven by the internal combustion engine and the electric machine, in each case alone or, for example in order to assist the internal combustion engine or the electric machine, together. For example, while driving in the new driving direction the dynamic of the internal combustion engine can be relaxed, whereby fuel consumption and emissions are reduced.

When the electric machine is arranged in the force flow ahead of the driving direction clutches, then during the braking of the work machine it is advantageous for the internal combustion engine to be decoupled from the drive-train by means of a separator clutch. This ensures that as much braking energy as possible is recuperated by the electric machine.

Following a successful change of the driving direction clutch, if the separator clutch is closed and the converter bridging clutch is opened or held open, the vehicle can be driven in the new driving direction by the internal combustion engine and/or by the electric machine. When the converter bridging clutch reaches a predetermined operating point it is closed and, to assist the internal combustion engine, at the same time the work machine is also driven by the electric machine.

Alternatively, after a change of the driving direction clutch the converter bridging clutch can be kept in or changed to its open condition and the vehicle can be driven in the new driving direction by the internal combustion engine and/or the electric machine. For example, by such electrical boosting, high rotational speeds and high power of the work machine can be produced as quickly as possible.

If in the drive-train of the work machine the electric machine is arranged in the force flow behind the torque converter, then after a change of the driving direction clutch the converter bridging clutch can be kept in or changed to its open condition and the vehicle can be driven in the new driving direction by the electric machine, whereas until it reaches an operationally required rotational speed and an operationally required torque the internal combustion engine follows on. In this way the fuel consumption and emissions of the internal combustion engine can be reduced.

When the driving direction clutch has been changed, during a transition phase the separator clutch can be kept in or changed to its open condition and the work machine can be driven by the electric machine, whereas until it reaches an operationally required rotational speed and an operationally required torque the internal combustion engine follows on and the separator clutch is then closed and the work machine is driven by the internal combustion engine.

Preferably, when the separator clutch is open the internal combustion engine is switched off. It is also conceivable, if a work drive output is arranged in the force flow ahead of the separator clutch, for the internal combustion engine to be operated in order to power the work drive output.

If the electric machine is arranged in the force flow behind the driving direction clutches, then at the first point in time the driving direction clutch associated with the current driving direction can be opened and the work machine can be braked by the electric machine until it comes to rest at the second time-point. This makes it possible to carry out the braking by means of the electric machine in a fully recuperative manner, with the internal combustion engine decoupled, until the work machine comes to rest at the second time-point.

If the driving direction clutches of the reversing gearbox are open, then driving can continue in the new driving direction by means of the electric machine, so that the internal combustion engine is not needed at all.

During this it is possible, when the work machine has come to rest at the second time-point and with the driving direction clutches open, to change the driving direction of the work machine by operating the electric machine with its rotational direction reversed.

Alternatively, before the second time-point has been reached the driving direction clutch associated with the new driving direction can be closed continuously and the propulsion of the work machine assisted, for example, by the internal combustion engine.

According to a further alternative, when the driving direction of the work machine has been changed the driving direction clutch associated with the new driving direction can be kept open and only when the work machine has reached a certain speed is it closed and the driving of the work machine assisted by the internal combustion engine. This reliably avoids stressing the driving direction clutches by a high starting torque and a large rotational speed difference.

Furthermore, after braking and bringing the work machine to rest at the second time-point, the driving direction clutch associated with the new driving direction can be changed to a slipping condition and the work machine can be started by the internal combustion engine and its movement at the same time assisted by the electric machine. During this it is conceivable to close the converter bridging clutch at an early stage and to carry out the starting process by the internal combustion engine and the electric machine only by way of the slipping driving direction clutch.

A further possibility is to keep the current driving direction clutch and the converter bridging clutch in the closed condition or change them thereto during the braking process. In this way the engine braking effect can be used for braking. To avoid stalling the internal combustion engine, when the internal combustion engine reaches a predetermined lower rotational speed limit the converter bridging clutch is opened and held in that condition, so that the work machine is braked to a standstill at the second time-point by the electric machine alone.

The work machine can also be braked by operating the electric machine as a generator and by means of the service brakes of the work machine. In this case the braking can be done both with a time offset and also simultaneously by the electric machine and by the service brakes.

The objective of the invention is also achieved by means of a device for controlling a mobile work machine having a reversing gearbox and a hybrid drive, in particular to carry out one of the above-described processes. The device according to the invention comprises a control unit connected to exchange signals with the drive-train of the work machine for implementing a powershifted driving direction reversal, by means of which unit at least one electric machine of the hybrid drive can be actuated for the recuperative braking of the work machine during the driving direction reversal.

For this purpose the control unit has a signal connection for detecting the accelerator pedal position, a signal connection for detecting a driving direction command from the driver, a signal connection for detecting a state of charge of the electrical energy accumulator for storing the energy recovered recuperatively and for supplying energy to the electric machine, signal connections for controlling the torque and rotational speed of the electric machine, signal connections for controlling the driving direction clutches of the reversing gearbox, and a signal connection for controlling the converter bridging clutch of the hydrodynamic torque converter. It is also conceivable to provide signal connections in the control unit for controlling the service brakes of the work machine.

It is advantageous for the control unit to be functionally integrated in a transmission control unit of the work machine.

BRIEF DESCRIPTION OF THE DRAWINGS

Below, the present invention is explained in more detail with reference to the drawings, in which.

DETAILED DESCRIPTION OF THE PREFERRED EMBODIMENTS

Figure 1:
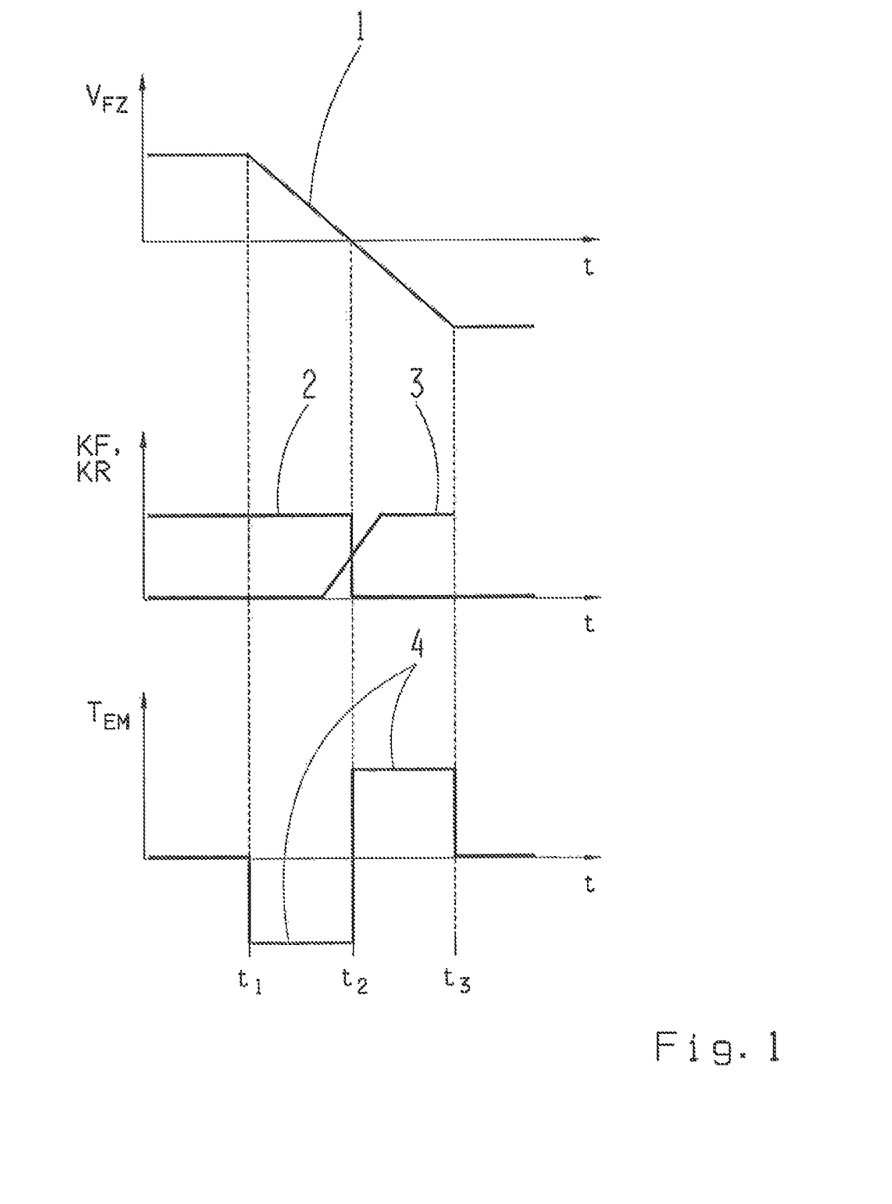
FIG. 1: A first example shows three diagrams of various parameters as a function of time for a method according to the invention for carrying out a driving direction reversal of a mobile work machine.
Figure 2:
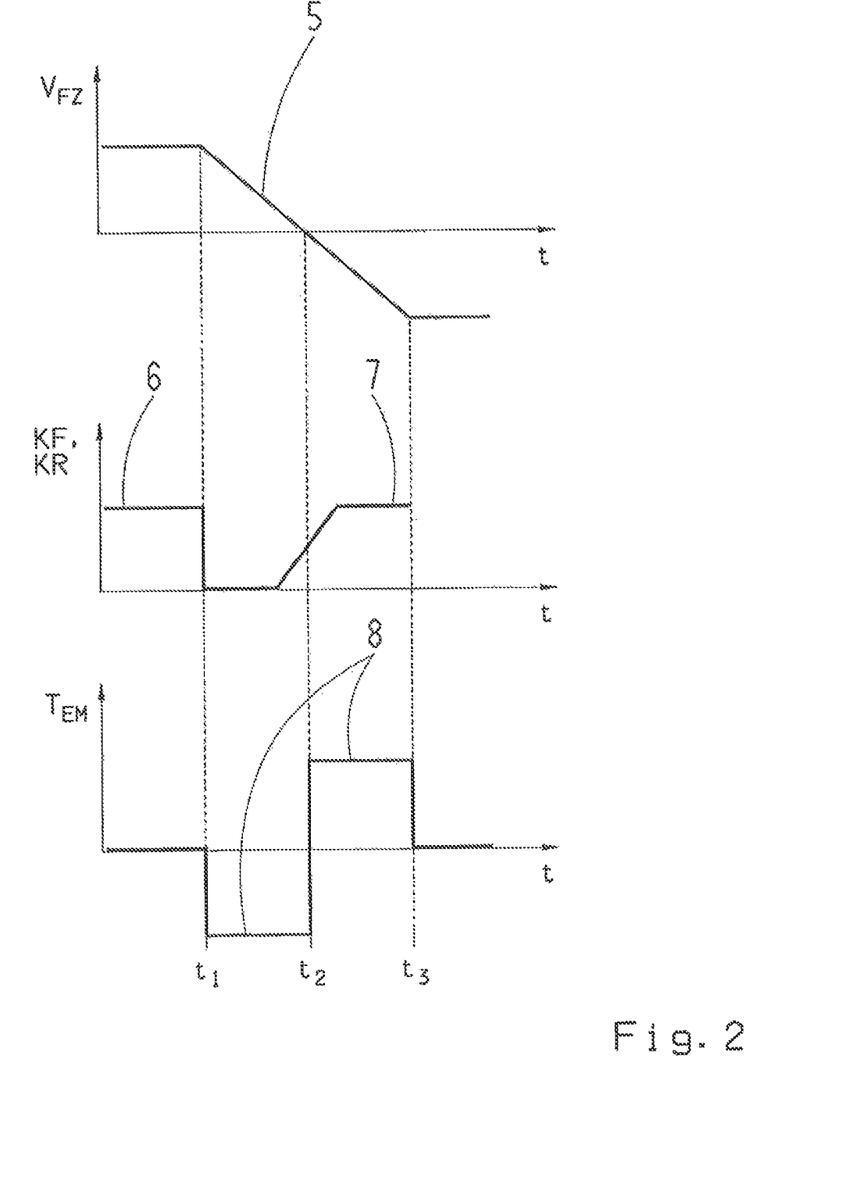
FIG. 2: A second example shows three diagrams of various parameters as a function of time for a method according to the invention for carrying out a driving direction reversal of a mobile work machine.

FIGS. 1 and 2 show graphical representations of respective example embodiments of a method according to the invention for carrying out the driving direction reversal, for example from the forward to the reverse driving directions of a mobile work machine, although the procedure according to the invention can also be used for the converse direction change. In each case the diagram at the top shows the speed variation 1, 5 of the work machine, the middle diagram shows the actuation sequence 2, 3, 6, 7 of the driving direction clutches KF, KR, and the lower diagram in each case shows the torque variation 4, 8 of the electric machine 9 (EM).

A first example embodiment of a method according to the invention, shown in FIG. 1, relates to an arrangement of the electric machine 9 of a hybrid drive in the drive-train of the work machine, ahead of the driving direction clutches KF, KR in the force flow direction. Driven by the internal combustion engine 10 of the hybrid drive, the work machine first moves at a certain constant initial speed in the forward direction, as can be seen from the speed variation 1. During this the driving direction clutch currently associated with the forward driving direction KF is at first kept closed and the driving direction clutch associated with the reverse driving direction KR is at first kept open, as can be seen from the actuation sequences 2 and 3. When a driving direction command is received from the driver, the work machine is braked recuperatively (speed variation 1, first time-point t1). For this the electric machine 9 is operated as a generator and therefore produces a negative torque, as can be seen from the torque variation 4. During this the speed of the work machine falls linearly to zero, which is reached at a second time-point t2. The actuation sequence 3 of the driving direction clutch associated with the reverse driving direction KR shows that it is closed in a linear and continuous manner as the second time-point t2 corresponding to zero speed is approached, so that at the zero-speed second time-point t2 the clutch KR is approximately half-closed. At that time point the driving direction clutch associated with the forward driving direction KF is opened abruptly, as shown by the corresponding actuation sequence 2. Thus, the actuation sequences 2 and 3 overlap. In this way, shortly before the second time-point t2 when the speed of the work machine reaches zero the driving direction clutches KF, KR are changed over to reverse the driving direction by a so-termed overlapping shift. Since the driving direction clutch associated with the forward driving direction KF is kept closed until shortly before the work machine comes to a standstill, it is ensured that the braking energy is recuperated by the electric machine 9 until the work machine has almost come to rest at the second time-point t2. After the driving direction change, in order to assist the internal combustion engine 10 the electric machine 9 is operated as a motor and produces a positive torque at constant acceleration until the constant initial speed is reached in the new, reverse direction (speed variation 1, third time-point t3), when the electric machine 9 is switched off.

A second example embodiment of a method according to the invention for carrying out a driving direction reversal, shown in FIG. 2, relates to an arrangement of the electric machine 9 behind the driving direction clutches KF, KR in the drive-train. With this arrangement braking by the electric machine 9 can be carried out with the driving direction clutches KF, KR open. For this, at the beginning of the braking process the driving direction clutch currently associated with the forward driving direction KF is opened abruptly, as can be seen from the actuation sequence 6 (first time-point t1). In this way, during the braking process the internal combustion engine 10 is decoupled from the drive input and from the electric machine 9. Consequently, almost until the work machine has come to a standstill (at the second time-point t2) the braking energy can be recuperated completely by the electric machine 9, as indicated by the negative torque variation 8. During this, as shown by its actuation sequence 7 the driving direction clutch associated with the reverse driving direction KR is at first held in the open condition. Close to the zero-speed time-point (second time-point t2) of the work machine, as shown by the speed variation 5 and in accordance with the actuation sequence 7 the driving direction clutch associated with the reverse driving direction KR is closed continuously in a linear manner as in the method according to FIG. 1, and after the driving direction has changed the internal combustion engine 10 is assisted by a positive torque variation 8 provided by the electric machine 9 during acceleration in the new driving direction.

Figure 3:
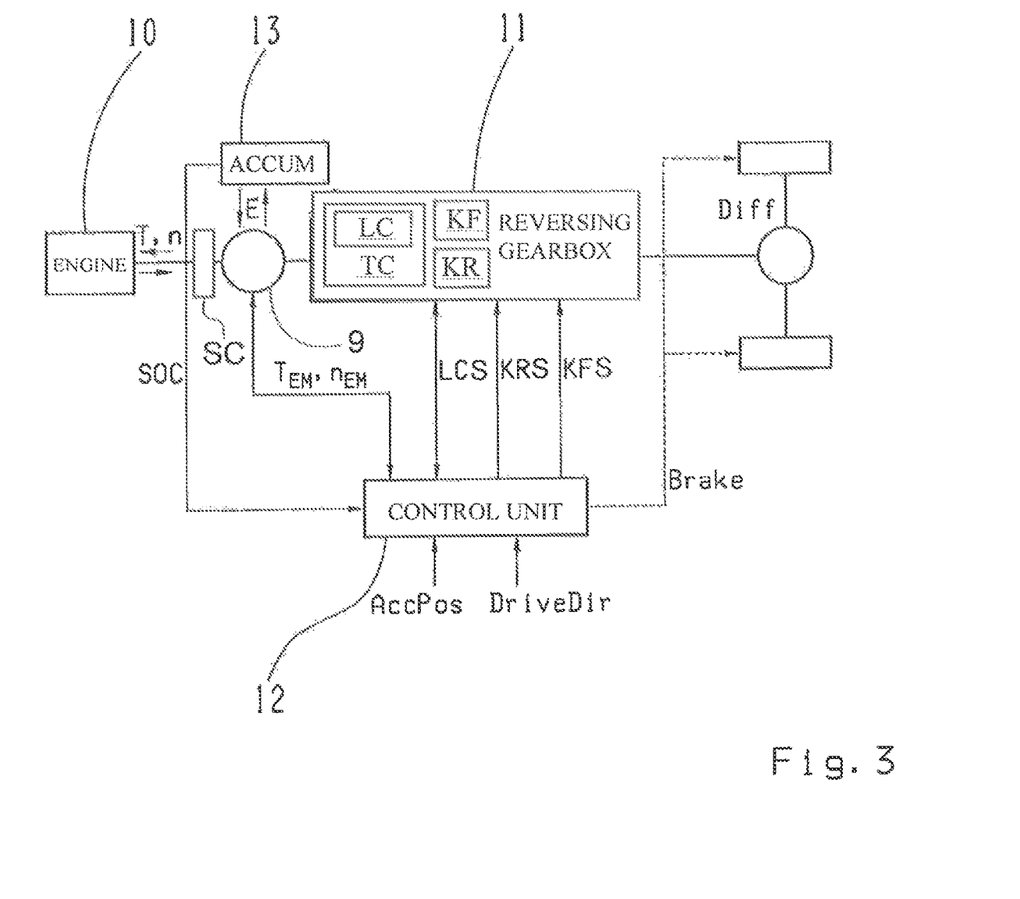
FIG. 3: A schematic view of a control system for reversing the driving direction, relating to a drive-train of a mobile work machine.

FIG. 3 shows an example of a mobile work machine, with reference to which a device according to the invention for controlling a powershifted driving direction reversal in a mobile work machine will be explained.

The drive-train comprises an internal combustion engine 10, an electric machine 9 and a reversing gearbox 11 for reversing the driving direction of the work machine, the gearbox comprising, at least, respective driving direction clutches KF, KR for the forward and reverse driving directions and a reversing gearset, as well as a main transmission which is connected to the differential Diff of the drive axle of the work machine. The internal combustion engine 10 and the electric machine 9 form a so-termed parallel hybrid. In the drive-train they are arranged in the force flow one behind the other, so that they can act conjointly upon the drive-train. The electric machine 9 is arranged in the force flow between the internal combustion engine 10 and the transmission input of the reversing gearbox 11. In the drive-train the internal combustion engine 9 can produce a torque T and a rotational speed n in the drive-train. Conversely, from the drive-train a torque T and a rotational speed n can be transmitted to the internal combustion engine 10.

In the drive-train, in the force flow the reversing gearbox 11 comprises one behind the other a hydrodynamic torque converter TC with a converter bridging clutch LC, at least driving direction clutches KF, KR for the forward and reverse driving directions, a reversing gearset and a powershift transmission as the main transmission. In this case a plurality of forward gears of the powershift transmission are associated with one driving direction clutch KF and one reversing gear is associated with the other driving direction clutch KF. The torque converter TC with its converter bridging clutch LC is arranged in the force flow between the internal combustion engine 10 and the driving direction clutches KF, KR. The powershift transmission is in driving connection with a differential of a driven axle of the work machine, which distributes the drive power produced in the drive-train to the wheels of the axle.

To select an appropriate strategy for reversing the driving direction of the work machine, a control unit 12 detects signals from the system components and evaluates them. To carry out the driving direction reversal the system components can be actuated by the control unit 12. In an electrical energy accumulator 13 (ACCUM), in this case an electric battery, the electrical energy E produced recuperatively by the electric machine 9 during braking can be stored and returned again to the electric machine 9 as necessary.

The electric signal flow connections or signal connections are in each case indicated by arrows. The control unit 12 detects the accelerator pedal position AccPos, the driver's driving direction command DriveDir, the state of charge SOC of the electric battery 13, the torque $T_{EM}$ and the rotational speed $n_{EM}$ of the electric machine 9 and the operating condition of the converter bridging clutch LC. To carry out the driving direction reversal the torque $T_{EM}$ and the rotational speed $n_{EM}$ of the electric machine 9, the converter bridging clutch LC, the driving direction clutches KR, KF and if necessary the service brakes BRAKE of the work machine that act on the wheels can be actuated by the control unit 12.

Alternatively, a separator clutch SC for decoupling the internal combustion engine 9 from the drive-train can be arranged between it and the electric machine 10, the operating condition of the separator clutch SC being detected by the control unit 12 so that the separator clutch SC can be actuated by the control unit 12.

INDEXES

1 Speed variation
2 Actuation sequence
3 Actuation sequence
4 Torque variation
5 Speed variation
6 Actuation sequence
7 Actuation sequence
8 Torque variation
9 Electric machine
10 Internal combustion engine
11 Reversing gearbox
12 Control unit
13 Electrical energy accumulator
E Energy
T Torque
n Rotational speed
AccPos Signal connection for accelerator pedal position
DriveDir Signal connection for driving direction command
SOC Signal connection for state of charge of the battery or energy accumulator
TEM Signal connection for the torque of the electric machine
nEM Signal connection for the rotational speed of the electric machine
LCS Signal connection for the converter bridging clutch
KFS Signal connection for a current/forward drive direction clutch
KRS Signal connection for an other/reverse drive direction clutch
BRAKE Signal connection for the service brakes
t1 First time-point, start of recuperation
t2 Second time-point, work machine at rest
t3 Third time-point, electric machine switched off
VFz Speed of the work machine
Diff Differential of the drive axle of the work machine

The invention claimed is:

1. A method of controlling a mobile work machine with a reversing gearbox (11), the method comprising:
   initiating a driving direction reversal, from a current driving direction to an other driving direction, by detecting a driving direction command;
   carrying out a change of torque transmission from the current driving direction to the other driving direction by powershifting;
   recuperatively braking the work machine to reverse the driving direction of the work machine; and
   at least partially engaging at least one of a current driving direction clutch (KF) and an other driving direction clutch (KR) of the reverse gearbox (11) during at least part of the recuperative braking.

2. The method according to claim 1, further comprising:
   when a driving direction command is received at a first point in time ($t_1$),
   operating an electric machine (10) of a hybrid drive in the drive-train of the work machine as a generator to brake the work machine, until the work machine has substantially stopped at a second time-point ($t_2$), and
   changing the torque transmission from the current driving direction to the other driving direction while the work machine is substantially at a standstill.

3. The method according to claim 2, further comprising:
   if the electric machine (9) is arranged in a force flow of the drive train between a primary source of drive-power (10) and the current driving direction clutch (KF) and the other driving direction clutch (KR),
   then
   keeping the current driving direction clutch (KF) engaged during the braking process until the work machine has substantially come to rest at the second time-point ($t_2$), and
   starting engagement of the other driving direction clutch (KR) before reaching the second time-point ($t_2$).

4. The method according to claim 3, wherein the primary source of drive-power (10) is an internal combustion engine, and further comprising:
   during the braking of the work machine, either keeping a converter bridging clutch (LC) of a torque converter (TC) in an engaged condition or changing the converter bridging clutch (LC) to the engaged condition, and
   when a predetermined lower rotational speed limit of the internal combustion engine (10) is reached,
   disengaging and holding the converter bridging clutch (LC) in the disengaged condition,
   then braking the work machine with service brakes until the work machine comes to rest at the second time-point ($t_2$), and
   thereafter engaging the other driving direction clutch (KR).

5. The method according to claim 3, further comprising:
   when a change of the driving direction clutch occurs,
   keeping a converter bridging clutch (LC) of a torque converter (TC) in the disengaged condition,
   driving the work machine in the other driving direction, and
   engaging the converter bridging clutch (LC) upon reaching a predetermined operating point.

6. The method according to claim 5, further comprising driving the work machine in the other driving direction by at least one of an internal combustion engine (10) and the electric machine (9).

7. The method according to claim 2, further comprising during the braking of the work machine by the electric machine (9), decoupling an internal combustion engine (10) from the drive-train via actuation of a separator clutch (SC).

8. The method according to claim 7, further comprising:
when the other driving direction clutch (KR) is fully engaged,
engaging the separator clutch (SC), and
either keeping a converter bridging clutch (LC) of a torque converter (TC) in a disengaged condition or changing the converter bridging clutch (LC) to a disengaged condition,
driving the work machine in the other driving direction with the internal combustion engine (10),
upon reaching a predetermined operating point, engaging the converter bridging clutch, and
driving the work machine by the electric machine (9) to assist the internal combustion engine (10).

9. The method according to claim 1, further comprising: of,
if an electric machine (9) is arranged in a force flow of the drive train such that the current driving direction clutch (KF) and the other driving direction clutch (KR) space the electric machine (9) from a primary source of drive-power (10),
then
disengaging the current driving clutch (KF) at a first time-point ($t_1$), and
braking the work machine by the electric machine (9) until the work machine comes to a standstill at a second time-point ($t_2$).

10. The method according to claim 9, further comprising driving in the other driving direction via the electric machine (9) before the other driving direction clutch (KR) is fully engaged.

11. The method according to claim 9, further comprising:
initiating an transition of the other driving direction clutch (KR) into a state of full engagement before the second time-point ($t_2$) is reached,
transitioning the other driving direction clutch (KR) into the state of full engagement at a substantially linear rate of change, and
assisting driving of the work machine by an internal combustion engine.

12. The method according to claim 1, further comprising braking the work machine via an electric machine (9) and service brakes of the work machine.

13. A control device for controlling a mobile work machine utilizing a method comprising initiating a driving direction reversal by detecting a driving direction command, carrying out a change of torque transmission from a current driving direction to an other driving direction by powershifting, recuperatively braking the work machine to reverse the driving direction of the mobile work machine, and at least one of a current driving direction clutch (KF) and an other driving direction clutch (KR) of a reverse gearbox (11) being at least partially engaged during at least part of the recuperative braking, the work machine having a reversing gearbox (11) and a hybrid drive, the device comprising:
a control unit (12) connected to exchange signals with a drive-train of the work machine in order to control a powershifted driving direction reversal, the control unit communicating with at least one electric machine (9) of the hybrid drive which is actuatable for recuperative braking of the work machine during the driving direction reversal.

14. The control device according to claim 13, wherein the control unit (12) has a signal connection for detecting an accelerator pedal position (AccPos), a signal connection for detecting a driving direction command (DriveDir) from a driver, a signal connection for detecting a state of charge (SOC) of an electrical energy accumulator (13) for storing the recuperatively recovered energy (E) and supplying the energy (E) to the electric machine (9), signal connections for controlling torque and rotational speed ($T_{EM}$, $n_{EM}$) of the electric machine (9), signal connections (KRS, KFS) for actuating the current driving direction clutch (KF) and the other driving direction clutch (KR) of the reversing gearbox (11) and a signal connection (LCS) for controlling a converter bridging clutch (LC) of the hydrodynamic torque converter (TC).

15. The control device according to claim 13, wherein the control unit (12) is integrated in a transmission control unit of the work machine.

16. A method of controlling a mobile work machine having a drive train comprising a hybrid drive and a reversing gearbox (11), an electric machine (9) being arranged in the drive train in a force flow between a primary source of drive-power (10) and a current driving direction clutch (KF) and an other driving direction clutch (KR) of the reversing gearbox (11), the method comprising the steps of:
initiating, via a control unit, a reversal of driving direction from a current driving direction to an other driving direction when a driving direction command is detected by the control unit;
changing torque transmission from the current driving direction to the other driving direction by powershifting;
recuperatively braking the work machine to reverse the driving direction of the work machine; and
at least partially engaging at least one of a current driving direction clutch (KF) and an other driving direction clutch (KR) of the reverse gearbox (11) during at least part of the recuperative braking.

17. The method according to claim 16, further comprising:
receiving, via the control unit, the driving direction command at a first point in time ($t_1$);
operating the electric machine (10) of the hybrid drive as a generator to brake the work machine, until driving of the work machine in the current driving direction substantially stops at a second time-point ($t_2$); and
changing the torque transmission in the reversing gearbox (11) from the current driving direction to the new driving direction while the work machine is substantially at a standstill.

18. The method according to claim 17, further comprising:
maintaining engagement of the current drive direction clutch (KF) in the reversing gearbox that is engaged to transmit torque in the current driving direction, during recuperative braking until the work machine substantially stops at the second time-point ($t_2$); and
initiating engagement of the other driving direction clutch in the reversing gearbox that is engaged to transmit torque in the other driving direction, before the work machine substantially stops at the second time-point ($t_2$).

19. The method according to claim 1 wherein the at least one of the current driving direction clutch (KF) and the other driving direction clutch (KR) are at least substantially halfway engaged during at least part of the recuperative braking.

20. The method according to claim 1 further comprising:

initiating engagement of the other driving direction clutch (KR) while the current driving direction clutch (KF) is fully engaged and an electric machine (9) is functioning as a generator, when the of the other driving direction clutch (KR) is substantially halfway engaged, substantially abruptly fully disengaging the current driving direction clutch (KF) and shifting the electric motor to function as a motor (9), and completing engagement of the other driving direction clutch (KR) while the current driving direction clutch (KF) is fully disengaged and the electric machine (9) is functioning as a motor.

* * * * *